United States Patent Office 3,631,075
Patented Dec. 28, 1971

3,631,075
3-OXYGENATED 21β - (SUBSTITUTED PHOSPHINYL)PREGNA-4/5, - 17(20),20 - TRIENES AND 19-NOR DERIVATIVES THEREOF
Walter R. Benn, Deerfield, Ill., assignor to
G. D. Searle & Co., Chicago, Ill.
No Drawing. Continuation-in-part of application Ser. No. 666,481, Sept. 8, 1967. This application Dec. 2, 1969, Ser. No. 881,588
Int. Cl. C07c 169/32, 169/34
U.S. Cl. 260—397.3        11 Claims

ABSTRACT OF THE DISCLOSURE

The above-entitled novel chemical compounds are obtained by reaction of an appropriate 17α-ethynyl-17β-hydroxy steroid with a substituted chlorophosphine or chlorophosphite and exhibit valuable pharmacological properties, e.g. anti-bacterial, anti-protozoal, anti-fungal and anti-inflammatory.

---

This application is a continuation-in-part of of my copending application Ser. No. 666,481, filed Sept. 8, 1967, now U.S. Pat. No. 3,484,463.

The present invention is concerned with phosphorous-containing steroid derivatives and, in particular, 3-oxygenated 21β-(substituted phosphinyl)pregna-4/5,17(20), 20-trienes and 19-nor derivatives thereof depicted by the following structural formula

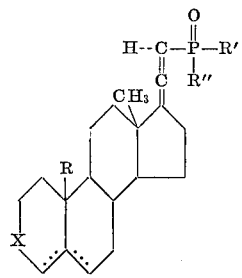

wherein R denotes hydrogen or a methyl radical, R' can be a phenyl, hydroxy, lower alkoxy or a 2-hydroxyethoxy radical, R" is a phenyl, hydroxy or lower alkoxy radical or R' and R" together comprise an alkylenedioxy group, the dotted lines denote a doubly bonded linkage alternatively at the 4, 5 or 5, 6 positions and X is a carbonyl, β-hydroxymethylene or β-(lower alkanoyl)oxymethylene radical.

The lower alkoxy radicals encompassed in the foregoing structural formula are typified by methoxy, ethoxy, propionyl, butyryl, valeryl, caproyl, heptanoyl and the branched-chain isomers thereof.

Representative of the alkylenedioxy groups depicted in that formula are ethylenedioxy, propylenedioxy and butylenedioxy.

Examples of the lower alkanoyl radicals encompassed in the X term shown in that formula are formyl, acetyl, propionyl, butyryl, valeryl, caproyl, heptenoyl and the corresponding branched-chain isomers.

Starting materials suitable for the manufacture of the compounds of this invention are the 17α-ethynyl-17β-hydroxy steroids represented by the following structural formula

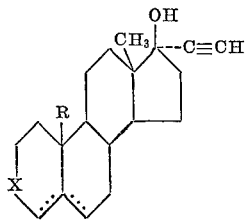

wherein R, X and the dotted lines have the same meanings as indicated hereinbefore.

The instant substituted aryl phosphinyl derivatives are produced when those starting materials are contacted with a substituted chlorophosphine. The process is specifically illustrated by the reaction of 17α-ethynylandrost-5-ene-3β,17β-diol 3-acetate with chlorodiphenylphosphine to afford 21β-diphenylphosphinylpregna-5,17(20),20-trien-3β-ol acetate.

The substituted alkoxy and hydroxy phosphinyl compounds of this invention are obtained by several alternate methods. One process involves reaction of the 17α-ethynyl-17β-hydroxy steroid with a mixture of a dialkyl- and trialkylphosphite. 17α - ethynylandrost-5-ene-3β,17β-diol 3-acetate, for example, is allowed to react with a mixture of diethylphosphite and triethylphosphite in the presence of sodium ethoxide, thus affording, after acidification, 21β-ethoxyhydroxyphosphinylpregna - 5,17(20),20 - trien-3β-ol acetate. When the steroidal starting material is contacted with a dialkylchlorophosphite, the corresponding dialkoxyphosphinyl derivatives are produced. The reaction of 17α-ethynyl-17β-hydroxyandrost-5-ene-3β,17β-diol 3-acetate, for example, with diethylchlorophosphite in methylene chloride containing pyridine results in 21β-diethoxyphosphinylpregna - 5,17(20),20-trien-3β-ol acetate. Those dialkoxyphosphinyl derivatives are alternatively produced by first reacting the steroidal starting material with phosphorous trichloride to yield the 21β-dichlorophosphinyl intermediate, then allowing the latter substance to react with a lower alkanol in the presence of pyridine. A specific illustration of that alternate process is provided by the reaction of the aforementioned 17α-ethynyl-17β-hydroxyandrost-5-ene-3β,17β-diol 3 - acetate with phosphorous trichloride to yield 21β-dichlorophosphinylpregna-5,17(20),20-trien - 3β - ol acetate, which is then contacted with ethanol in the presence of pyridine to afford the same product abovedescribed, i.e. 21β-diethoxyphosphinylpregna-5,17(20),20-triene-3β-ol acetate.

Reaction of the instant 3-(lower alkanoates) with a suitable alkaline reagent affords the corresponding 3-ols. Typically, 21β - diethoxyphosphinylpregna-5,17(20),20-trien-3β-ol acetate is stirred with methanolic sodium methoxide, thus affording 21β - diethoxyphosphinylpregna-5,17(20),20-triene-3β-ol.

Hydrolysis of the instant 21-dichlorophosphinyl intermediates affords the corresponding 21β-dihydroxyphosphinyl compounds. 21β - dichlorophosphinylpregna - 5, 17(20),20-triene-3β-ol acetate is thus contacted with aqueous dioxane to afford 21β-dihydroxyphosphinylpregna-5,17(20),20-triene-3β-ol acetate.

The compounds of the present invention are useful as a result of their valuable pharmacological properties. They are, for example, anti-inflammatory agents. In addition, they possess anti-microbial properties as is evidenced by their anti-bacterial, anti-protozoal and anti-fungal activity.

The anti-inflammatory property of the instant compounds is specifically illustrated by the activity of 21β-diphenylphosphinylpregna-4,17(20),20-triene-3-one and the cyclohexylamine salt of 21β-ethoxyhydroxyphosphinylpregna-5,17(20),20-trien-3β-ol when tested in a modification of the assay described by Winter et al., Proc. Soc. Exper. Biol. and Med., 111, 544 (1962). Details of that assay are as follows:

Each of a group of 10 intact male rats weighing 100–130 g. is injected under the plantar surface of each hind foot with 0.1 ml. of a 1% solution of carageenin (Type 402, Marine Colloids, Inc.). The test compound, dissolved or suspended in saline, corn oil or propylene glycol, is administered subcutaneously or intragastrically 1 hour prior to the carageenin injection. The doses normally employed are 25 mg. per rat subcutaneously and 5 mg. per rat intragastrically. Another such group serving as controls is treated in the identical manner save for omission of the test compound. The edema resulting from carageenin injection is determined by measuring the circumference of the hind feet, in arbitrary units, 5 hours after the carageenin injection and subtracting the average swelling of the group treated with the test compound from the average swelling of the control group. Compounds are rated active if they produce a significant decrease (P<0.05) in the swelling observed in the control animals.

Evidence for the anti-bacterial properties of the instant compounds is provided by the activity of 21β-diethoxyphosphinylpregna-5,17(20),20-trien-3β-ol acetate, 21β-diethoxyphosphinylpregna-4,17(20),20-trien-3-one and 21β-diethoxyphosphinylpregna-5,17(20),20-trien-3β - ol when assayed by the following procedure:

In this test, nutrient broth (manufactured by Baltimore Biological Laboratories or Difco) is prepared at twice the concentration recommended by the manufacturer, sterilized and inoculated with 2% by volume of a culture of Erwinia sp. Meanwhile, the test compound is heated in sterile distilled water at a concentration of 2000 mcg. per ml. and a temperature of 80° C. for 20 minutes. An equi-volume mixture of this compound preparation and the inoculated broth is incubated aerobically at 37° C., then examined grossly for growth of the test organism. The incubation period is 24–28 hours. If growth of the test organism is observed, the compound is considered inactive. If no such growth is observed, the incubated mixture is serially diluted and mixed with an inoculated broth of the same composition as before excepting that the concentration is halved and 1% by volume of the culture instead of 2% is incorporated. Amounts of the latter broth added are such that concentrations of 100, 10 and 1 mcg. of compound per ml. result. The mixtures thus obtained are incubated as before and then examined grossly for growth of the test organism. Potency is expressed as the minimum concentration at which no growth of the test organism is discernible. Controls are provided by concurrent incubations identical with the foregoing except for absence of the test compound.

The anti-protozoal property of the compounds of this invention is evidenced by the activity of 21β-diethoxyphosphinylpregna-5,17(20),20-trien-3β-ol acetate, 21β-diethoxyphosphinylpregna-4,17(20),20-trien-3-one and 21β-ethoxyhydroxyphosphinylpregna - 5,17(20),20 - trien-3β-ol when tested in the following assay:

To 80 volumes of a modified Diamond medium prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate and 54,000 parts of distilled water, adjusting the pH to 6.8 with 4% aqueous sodium hydroxide, incorporating 30 parts of agar (Baltimore Biological Laboratories) boiling for 1 minute to dissolve the agar and sterilizing in an autoclave is added aseptically 20 volumes of sterile Dubos medium serum. The resulting medium is inoculated with 1% by volume of a 72-hour culture of *Trichomonas vaginalis*, whereupon 1 ml. of the inoculated medium is mixed with 10 mg. of the test compound. The mixture is incubated anaerobically at 37° C. for 48 hours, then is examined microscopically for the presence of motile trichomonads. If any are observed, the compound is considered inactive. If no motile trichomonads are observed, 0.1 ml. of the incubated mixture is serially diluted and mixed with additional quantities of the inoculated medium sufficient to produce concentrations of 1000, 100, 10 and 1 mcg. of test compound per ml. and the resulting mixtures are inoculated anaerobically as before at 37° C. for 48 hours, then are examined microscopically for the presence of motile trichomonads. Controls are provided by concurrent incubations identical with the foregoing except for the absence of the test compound.

The activity of 21β-diethoxyphosphinylpregna-5,17-(20),20-trien-3β-ol acetate and 21β- diethoxyphosphinylpregna-4,17(20),20-trien-3-one in the following assay are specific examples of the anti-fungal activity of the compounds of this invention:

The test compound is dissolved or suspended in melted Sabouraud agar and is held at 80° C. for 20 minutes. Dilutions are made from this preparation in melted Sabouraud agar in order to give concentrations of the test substance of 1000, 100, 10 and 1 mcg./ml. in the agar. The agar is permitted to cool and solidify and is then surface inoculated with a suspension of spores of *Verticillium albo atrum*. The inoculated media are incubated at room temperature for 6–7 days, then are examined grossly for the presence or absence of growth of the test organism. Control preparations lacking the test compound are employed for comparative purposes. The activity of the compound is recorded as mcg. of the compound/ml. of agar which completely prevents visible growth of the test organism.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples temperatures are given in degrees centigrade (° C.). Quantities of materials are expressed in parts by weight unless otherwise noted.

EXAMPLE 1

To a cold solution of 11 parts of 17α-ethynylandrost-5-ene-3β,17β-diol 3-acetate in 112 parts of chloroform containing 3 parts of pyridine is added with stirring a solution of 7.57 parts of chlorodiphenylphenylphosphine in 37 parts of chloroform. That reaction mixture is allowed to warm to room temperature, then is stirred for about 48 hours. At the end of that time the reaction mixture is diluted with chloroform, then washed successively with dilute hydrochloric acid, water, saturated aqueous sodium carbonate, water and saturated aqueous sodium chloride. Drying over anhydrous sodium sulfate followed by evaporation of the solvent affords a glass-like residue, which is triturated with ether in order to induce crystallization. The resulting crude product is collected by filtration, then purified by recrystallization from acetone to yield pure 21β-diphenylphosphinylpregna-5,17-(20),20-triene-3β-ol acetate, melting at about 188–190°. It exhibits an optical rotation of +119.5° in chloroform, infrared absorption maxima, in a potassium bromide disc, at about 5.11, 5.75, 6.94, 7.96, 8.44, 8.93, 9.06 and 9.67 microns and also nuclear magnetic resonance peaks at about 20, 59.5, 122, 277, 323, 346–361 and 443–476 cycles per second. It is represented by the following structural formula

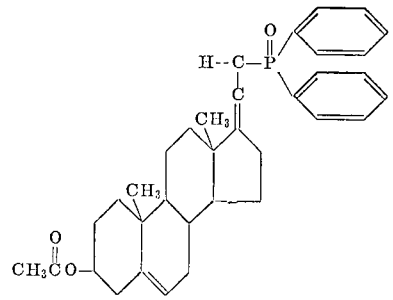

EXAMPLE 2

To a slurry of 10 parts of 17α-ethynyl-17β-hydroxy-androst-4-en-3-one with 300 parts of chloroform containing 4 parts of pyridine is added slowly with stirring a solution of 10.5 parts of chlorodiphenylphosphine in 75 parts of chloroform. The reaction mixture is stirred at room temperature for about 5 days, then is filtered in order to remove some unreacted starting material. The filtrate is diluted with chloroform, then is washed successively with dilute hydrochloric acid, water, saturated aqueous sodium carbonate, water and saturated aqueous sodium chloride. The washed solution is then dried over anhydrous sodium sulfate and evaporated to dryness under reduced pressure. The glass-like residue thus produced is extracted with benzene and the benzene solution is chromatographed on magnesium silicate. Elution with 20–80% ethyl acetate in benzene solutions followed by recrystallization of the eluted fractions from acetone affords pure 21β-diphenylphosphinylpregna-4,17(20),20-trien-3-one, melting at about 195–201° with decomposition and displaying an optical rotation of +316.8° in chloroform. Ultraviolet absorption maxima are observed at about 223.5 and 272 millimicrons with an inflection at about 244 millimicrons, those peaks possessing, respectively, molecular extinction coefficients of about 33,500, 1,930 and 19,900. In a potassium bromide disc infrared absorption peaks are observed at about 5.12, 5.98, 6.19, 6.96, 8.13, 8.35, 8.94, 9.11, 11.59, 12.78, 13.45 and 14.36 microns. Nuclear magnetic resonance maxima are observed at about 22.5, 69, 344, 347.5–362.5 and 443–447 cycles per second.

EXAMPLE 3

To a solution of 10 parts of 17α-ethynyl-17β-hydroxyester-4-en-3-one in 150 parts of chloroform containing 4 parts of pyridine, cooled to about 8°, is added with stirring, over a period of about 15 minutes, 11 parts of chlorodiphenylphosphine. The reaction mixture is allowed to come to room temperature, then is stirred for about 44 hours. Dilution with chloroform followed by washing successively with dilute hydrochloric acid, water, saturated aqueous sodium bicarbonate, water and saturated aqueous sodium chloride, drying over anhydrous sodium sulfate and evaporation of the solvent under reduced pressure affords the crude product as an off-white solid. Recrystallization from acetone affords pure 21β-diphenylphosphinyl-19-nor-pregna-4,17(20),20-trien-3-one as two polymorphic forms, one form showing a transition point at about 195° and melting at the melting point of the other form, i.e. about 240° with decomposition. This compound exhibits an optical rotation, in chloroform, of +277.5°, ultraviolet absorption maxima at about 224 and 272 cycles per second with molecular extinction coefficients of 37,200 and 2,030, respectively, and also an inflection at about 240 millimicrons with a molecular extinction coefficient of about 25,000. Both polymorphic forms exhibit identical infrared spectra in chloroform, displaying peaks at about 5.11, 6.00, 6.18, 6.95, 8.49, 8.92 and 9.06 microns. Nuclear magnetic resonance maxima are observed at about 24, 350, 352–362 and 443–478 cycles per second. This compound is represented by the following structural formula

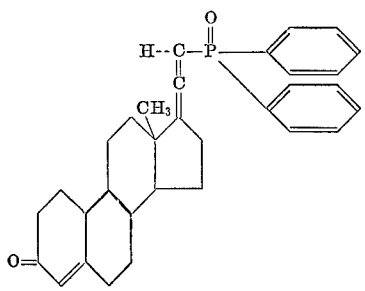

EXAMPLE 4

To a slurry of 7.1 parts of 17α-ethynylandrost-5-ene-3β,17β-diol 3-acetate in 194 parts of triethyl phosphite containing 3.3 parts of diethyl phosphite, in a nitrogen atmosphere, is added with stirring 1.1 parts of sodium ethoxide. The resulting reaction mixture is gradually warmed to effect homogeneity, then is stirred at room temperature for 3¼ hours. During that period a heavy precipitate forms which, after cooling to room temperature, is removed by filtration under nitrogen. Partition of that solid crude product between ether and water affords an aqueous solution, which is concentrated to dryness under nitrogen, thus producing the sodium salt of 21β-ethoxyhydroxyphosphinylpregna - 5,17(20),20 - trien - 3β - ol acetate, which sinters at about 300°. This sodium salt exhibits infrared absorption peaks, in a potassium bromide disc, at about 5.09, 5.75, 7.96–8.18, 9.25, 9.45, 10.59 and 12.45 microns.

The latter sodium salt is converted to the free acid by passage of a 50% aqueous ethanol solution through a strongly acid cation exchange resin. The acid crystallizes out of the eluate upon cooling, thus affording 21β-ethoxyhydroxyphosphinylpregna - 5,17(20),20 - trien - 3β - ol acetate as the hemihydrate, melting at about 167°. It exhibits infrared absorption maxima, in a potassium bromide disc, at about 2.90, 5.09, 5.75, 7.91, 8.02, 9.65, 10.05 and 10.43 micrcons and also nuclear magnetic resonance peaks at about 59, 62.5, 80, 122, 246, 277, 322 and 327 cycles per second. This compound is represented by the following structural formula

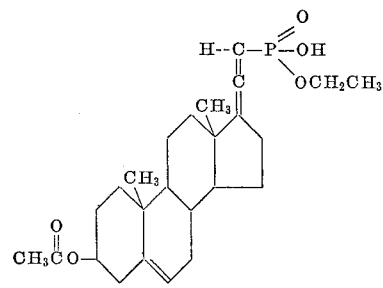

The 50% aqueous ethanol eluate obtained as described above is heated briefly, then is concentrated to dryness under reduced pressure and the resulting residue is extracted with chloroform. Removal of the chloroform by distillation under reduced pressure affords 21β-ethoxyhydroxyphosphinylpregna - 5,17(20),20 - trien - 3β - ol, melting with decomposition at about 201–205°. It exhibits infrared absorption peaks, in chloroform at about 2.73, 5.09, 8.40, 9.55, 9.64 and 10.11 microns and nuclear magnetic resonance peaks at about 59, 61.5, 80, 212, 245, 323 and 451 cycles per second.

A solution of 4.5 parts of the latter 3β-hydroxy compound in 24 parts of ethanol is mixed with one part of cyclohexylamine and the resulting precipitated salt is collected by filtration then purified by recrystallization from ethanol. The resulting cyclohexylamine salt of 21β-ethoxyhydroxyphosphinylpregna - 5,17(20),20 - trien - 3β - ol melts with decomposition at about 254° and displays infrared absorption maxima, in a potassium bromide disc, at about 3.00, 4.57, 5.10, 8.51, 8.58, 9.20, 9.51, 10.63 and 12.51 microns. It is represented by the following structural formula

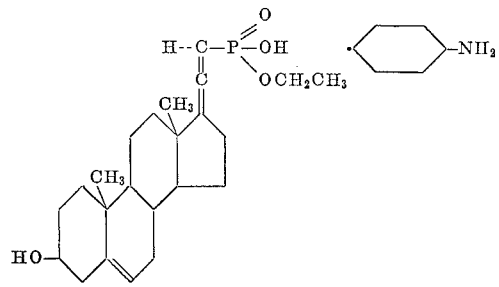

EXAMPLE 5

To a solution of 8.19 parts of 17α-ethynyl-17β-hydroxyandrost-4-en-3-one and 3 parts of pyridine in 400 parts of methylene chloride is added with cooling 4.7 parts of diethylchlorophosphite. The resulting reaction mixture is stirred and cooled for about 3½ hours, at the end of which time it is washed successively with cold dilute hydrochloric acid, water, saturated aqueous sodium bicarbonate, water and saturated aqueous sodium chloride. The organic layer is separated, dried over anhydrous sodium sulfate and concentrated to dryness to afford a white solid residue. Recrystallization of that material from methylcyclohexane-ether affords prism-like crystals of 21β-diethoxyphosphinylpregna - 4,17(20),20 - trien - 3 - one, melting at about 122–125°. An ultraviolet absorption maximum is observed at about 240 millimicrons with a molecular extinction coefficient of about 15,100. In chloroform, this compound exhibits infrared absorption peaks at about 5.10, 6.00, 6.19, 8.09, 9.50 and 9.70 microns. It displays also nuclear magnetic resonance peaks at about 62, 72.5, 80, 248.5, 320 (multiplet) and 347 cycles per second. This compound is represented by the following structural formula

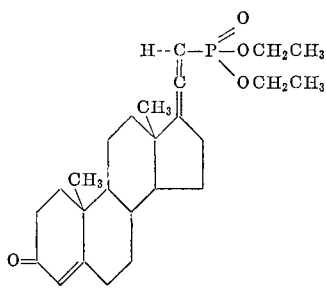

EXAMPLE 6

Method A

To a solution of 5.3 parts of 17α - ethynyl - 17β - hydroxyandrost - 5 - ene - 3β,17β - diol 3-acetate and 1 part of pyridine in 93 parts of dry methylene chloride is added, with cooling by means of an ice bath, 2.24 parts of diethylchlorophosphite. The reaction mixture is stirred and cooled for about 16 hours, then is washed successively with cold dilute hydrochloric acid, water, saturated aqueous sodium bicarbonate, water and saturated aqueous sodium chloride. The organic solution is dried over anhydrous sodium sulfate and concentrated to dryness under reduced pressure, thus affording the solid crude product. Recrystallization of that material from methylcyclohexane-ether results in 21β - diethoxyphosphinylpregna - 5,17(20),20 - trien - 3β - ol acetate, isolated as large prismatic crystals melting at about 107–111°. Infrared absorption peaks are observed at about 5.11, 5.87, 7.96 and 9.72 microns and nuclear magnetic resonance maxima at about 60, 63, 80, 127, 248, 278, 319 and 326 cycles per second.

Method B

A solution of 5 parts of 17α - ethynyl - 17β - hydroxyandrost - 5 - ene - 3β,17β - diol 3-acetate in 314 parts of phosphorous trichloride is stirred and cooled at about −20° for approximately 30 minutes. The reaction mixture is then allowed to warm to room temperature and the excess phosphorous trichloride is removed by distillation under reduced pressure. The resulting crude 21β-dichlorophosphinylpregna - 5,17(20),20 - trien - 3β - ol acetate is dissolved in 133 parts of methylene chloride containing 5 parts of pyridine and 36 parts of ethanol is added. That mixture is stirred at room temperature for about 18 hours, then is concentrated under reduced pressure to afford a gummy solid residue. That material is dissolved in ether and the ether solution is separated, washed successively with dilute hydrochloric acid, saturated aqueous sodium carbonate and saturated aqueous sodium chloride, then is dried over anhydrous sodium sulfate and concentrated under reduced pressure. The resulting solid crude product is recrystallized from methylcyclohexane-ether to afford the identical product described in Method A. It is represented by the following structural formula

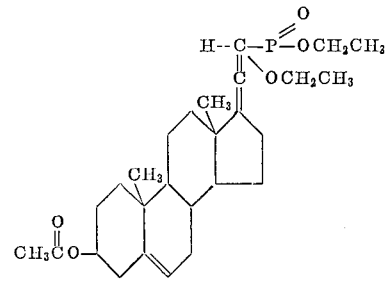

EXAMPLE 7

A methanolic solution of sodium methoxide is prepared by allowing 0.214 part of sodium metal to react with 24 parts of methyl alcohol. To that solution is then added 2.2 parts of 21β - diethoxyphosphinylpregna - 5, 17(20),20 - trien - 3β - ol acetate. That reaction mixture is stirred at room temperature for about 7 hours, then is concentrated to dryness under reduced pressure, thus affording a syrupy residue. That residue is dissolved in ether and the ether solution is washed successively with water and saturated aqueous sodium chloride. Drying over anhydrous sodium sulfate followed by removal of the solvent under reduced pressure affords the crystalline product. Recrystallization of that product from ethyl acetate-hexane affords pure 21β - diethoxyphosphinylpregna - 5,17(20),20 - trien-3β-ol, melting at about 154–157°. This compound exhibits an optical rotation, in chloroform, of +49.3°, infrared absorption peaks, in chloroform, at about 2.75, 5.10, 8.01, 9.50, 9.69 and 10.3 microns and nuclear magnetic resonance maxima at about 59, 62, 80, 212, 247, and 323–329 cycles per second.

EXAMPLE 8

A mixture containing 6.4 parts of 21β - dichlorophosphonopregna - 5,17(20),20 - trien - 3β - ol and 160 parts of methanol is stirred at room temperature for about 16 hours. At the end of that time the excess methanol is removed by distillation under reduced pressure and the resulting solid residue is recrystallized from ethyl acetate to afford 21β - hydroxymethoxyphosphinylpregna - 5, 17(20),20 - trien - 3β - ol, melting with decomposition at about 209–213°. Infrared absorption maxima in a potassium bromide disc are observed at about 3.6, 5.08, 8.35, 9.50 and 9.65 microns. This compound is characterized further by the following structural formula

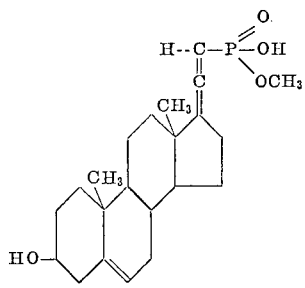

The filtrate from the above ethyl acetate recrystallization is diluted with fresh ethyl acetate, then is washed successively with aqueous sodium carbonate and aqueous sodium chloride. Drying of the solution over anhydrous sodium sulfate followed by concentration to dryness under reduced pressure affords 21β - dimethoxyphosphinylpregna - 5,17(20),20 - trien - 3β - ol, which displays a melting point at about 178–183° and an optical rotation in chloroform of +0.105°. Infrared absorption maxima are observed in chloroform at about 2.74, 5.09, 9.45, 9.55 and 9.64 microns and nuclear magnetic resonance peaks at about 59, 61, 219, 230, 314 and 323 cycles per second.

This compound is represented by the following structural formula

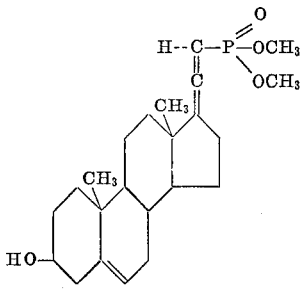

EXAMPLE 9

A solution containing 6.4 parts of 21β-dichlorophosphinylpregna-5,17(20),20-trien-3β-ol acetate, 133 parts of methylene chloride, 5 parts of pyridine and 20 parts of methanol is stirred at room temperature for about 20 hours, then is concentrated under reduced pressure to afford a syrupy residue. That residue is dissolved in ether and the ether solution is washed successively with cold dilute hydrochloric acid, saturated aqueous sodium carbonate and aqueous sodium chloride. The ether solution is then dried over anhydrous sodium sulfate and concentrated to dryness under reduced pressure. Recrystallization of the resulting residue from methylcyclohexane affords blade-like crystals of 21β-dimethoxyphosphinyl-pregna-5,17(20),20-trien-3β-ol acetate, melting at about 139–143°. Infrared absorption maxima, in chloroform, are observed at about 5.10, 5.78, 7.93, 9.62 and 9.70 microns. Nuclear magnetic resonance peaks are displayed at about 59, 62, 122, 219, 230, 315 and 323 cycles per second. This compound is represented by the following structural formula

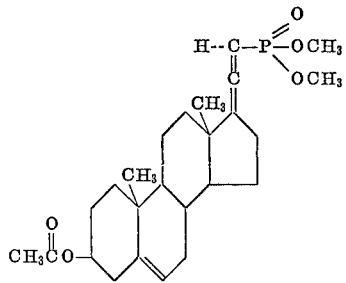

EXAMPLE 10

To a solution of 10 parts of 17α-ethynyl-17β-hydroxy-estr-4-en-3-one in 400 parts of methylene chloride containing 4 parts of pyridine is added dropwise, with cooling and stirring over a period of about 30 minutes, 6.26 parts of diethylchlorophosphite. The resulting reaction mixture is allowed to warm to room temperature, then is stirred at that temperature for about 6 hours. It is then washed successively with cold dilute hydrochloric acid, saturated aqueous sodium carbonate and aqueous sodium chloride. Drying of that solution over anhydrous sodium sulfate followed by removal of the solvent by distillation under reduced pressure affords the crude solid product, which is recrystallized from ethyl acetate. Further purification is effected by chromatography on magnesiated silica followed by elution with a 60% ethyl acetate in benzene mixture and recrystallization of the eluted material from methylcyclohexane-acetone, thus affording 21β-diethoxy-phosphinyl-19-norpregna - 4,17(20,20 - triene - 3 - one, melting at about 141–147°. It is characterized further by an optical rotation of +197° in chloroform, an ultraviolet absorption maximum at about 239 millimicrons with a molecular extinction coefficient of about 18,000, infrared absorption peaks, in chloroform, at about 5.10, 6.00, 6.19, 8.05, 9.49, 9.70 and 10.35 microns and also nuclear magnetic resonance maxima at about 63, 80, 248, 319, 327 and 353 cycles per second. This compound is represented by the following structural formula

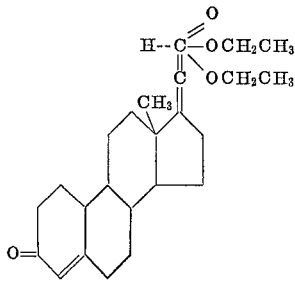

EXAMPLE 11

A solution of 10 parts of 17α-ethynylandrost-5-ene-3β, 17β-diol 3-acetate in 400 parts of methylene chloride containing 5 parts of pyridine is cooled to approximately —20° and 4.75 parts of ethylenechlorophosphite is then added with stirring. That reaction mixture is stirred at about 5° for 16 hours, then for an additional 6 hours at room temperature. It is then washed successively with cold dilute hydrochloric acid, water, dilute aqueous potassium hydroxide and saturated aqueous sodium chloride, dried over anhydrous sodium sulfate and partially concentrated under reduced pressure to afford prism-like crystals of 21β-ethylenedioxy-phosphinylpregna-5,17(20), 20-trien-3β-ol acetate. This compound melts at about 270–275° with decomposition and exhibits infrared absorption peaks, in chloroform, at about 5.11, 5.79, 7.94, 9.58, 10.80 and 11.55 microns. Nuclear magnetic resonance peaks are observed at about 60, 63.5, 123, 248–290 and 323–341 cycles per second. It is represented by the following structural formula

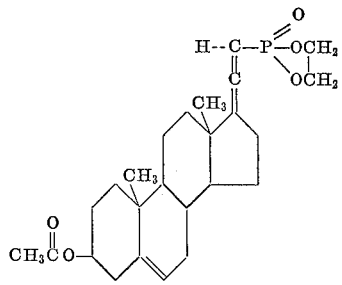

EXAMPLE 12

To a solution of 10 parts of 17α-ethynylandrost-5-ene-3β,17β-diol 3-acetate in 400 parts of methylene chloride containing 5 parts of pyridine, cooled to about —20°, is added with stirring 4.75 parts of ethylenechlorophosphite. The mixture is allowed to react at about 5° for 16 hours, then at room temperature for about 6 hours. It is then washed successively with dilute hydrochloric acid, water and saturated aqueous sodium chloride, dried over anhydrous sodium sulfate and partially concentrated under reduced pressure. The product which crystallizes from that solution is purified by recrystallization, first from acetone then from methanol, to afford 21β-hydroxy) (2 - hydroxyethoxy)phosphinylpregna - 5,17(20),20-trien-3β-ol acetate, melting with decomposition at about 199–202°. Infrared absorption maxima in chloroform are observed at about 2.68, 2.75, 2.90, 5.09, 5.78, 6.21, 7.95 and 9.68 microns. Nuclear magnetic resonance peaks, in deuteriopyridine, are displayed at about 59, 62, 124, 230–290, 330, 364, 368 and 509 cycles per second. This compound is characterized also by the following structural formula

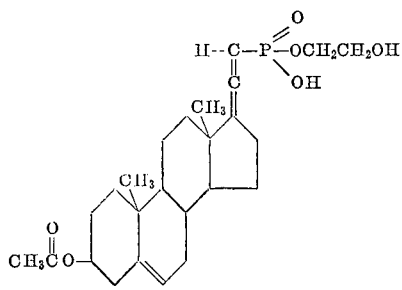

EXAMPLE 13

To a solution of 1 part of potassium hydroxide in 48 parts of methanol is added 3 parts of 21β-hydroxy(2-hydroxyethoxy)phosphinylpregna - 5,17(20),20-trien-3β-ol acetate and the resulting reaction mixture is stirred at room temperature for about 16 hours. The white solid which precipitates from the mixture is collected by filtration, washed with methanol and dried to afford the potassium salt of 21β - hydroxy(2-hydroxyethoxy)phosphinylpregna - 5,17(20),20-trien-3β-ol. A solution of that potassium salt in aqueous ethanol is passed through a cationic ion exchange resin and the prism-like crystals which separate from the solution are isolated by filtration and dried to afford 21β-hydroxy-(2-hydroxyethoxy)phosphinylpregna - 5,17(20),20 - trien-3β-ol. This compound melts with decomposition at about 218–220° and displays infrared absorption peaks, in a potassium bromide disc, at about 3.10, 5.10, 8.20, 8.45, 9.20, 9.39 and 9.70 microns. Nuclear magnetic resonance maxima, in deuteriodimethyl sulfoxide are observed at about 54, 58, 203–240, 310–330 and 347 cycles per second. This compound is represented by the following structural formula

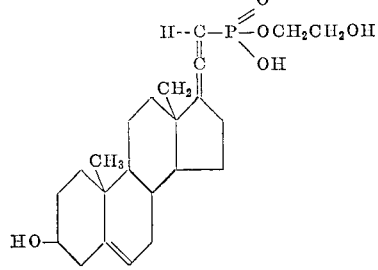

EXAMPLE 14

To a solution of 10 parts of 17α-ethynyl-17β-hydroxyester-4-en-3-one in 400 parts of methylene chloride containing 5 parts of pyridine is added, with cooling and stirring, 5.7 parts of ethylenechlorophosphite. The resulting reaction mixture is stirred at 0–5° for about 20 hours, then is washed successively with dilute hydrochloric acid, dilute aqueous potassium hydroxide and saturated aqueous sodium chloride. The organic layer is separated, dried over anhydrous sodium sulfate and concentrated to dryness under reduced pressure, thus affording the white solid crude product. That material is purified by recrystallization from ethanol-chloroform to afford platelet-like crystals of 21β - ethylenedioxyphosphinyl - 19 - norpregna-4,17(20),20-trien-3-one, which melts at about 215–220° with decomposition. This compound exhibits an ultraviolet absorption maximum at about 239 millimicrons with a molecular extinction coefficient of about 17,100. Nuclear magnetic resonance peaks are observed at about 62.5, 244–277, 323.5, 333 and 350 cycles per second. Its infrared absorption spectrum displays maxima at about 5.10, 5.96, 6.12, 7.84 and 9.56 microns. This compound is represented by the following structural formula

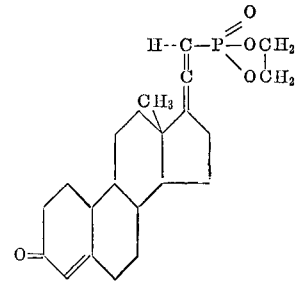

EXAMPLE 15

When an equivalent quantity of 17α-ethynylandrost-5-ene-3β,17β-diol 3-propionate is substituted in the procedure of Example 1, there is produced 21β-diphenylphosphinylpregna-5,17(20),20-trien-3β-ol propionate.

EXAMPLE 16

When an equivalent quantity of 17α-ethynyl-17β-hydroxyandrost-5-ene - 3β,17β - diol 3 - propionate is substituted in the method described in Method A of Example 6, there is produced 21β-diethoxyphosphinylpregna-5,17(20),20-trien-3β-ol propionate.

EXAMPLE 17

By substituting an equivalent quantity of 17α-ethynylandrost-5-ene-3β,17β-diol 3-propionate in the procedure of Example 4, there is obtained 21β - ethoxyhydroxyphosphinylpregna-5,17(20),20-trien-3β-ol propionate.

EXAMPLE 18

A solution of 4.2 parts of 21β-ethylenedioxyphosphinyl-19-norpregna - 4,17(20),20 - trien-3-one in 80 parts of methanol containing 1.2 parts of concentrated hydrochloric acid is stirred at room temperature for about 24 hours, then is concentrated under reduced pressure to afford a syrupy residue. That residue is dissolved in chloroform and the chloroform solution is extracted with dilute aqueous potassium hydroxide. The alkaline extract is heated under reduced pressure to remove dissolved chloroform, then is acidified by means of dilute hydrochloric acid. The resulting precipitated solids are collected by filtration, washed with water and dried, then purified by recrystallization from aqueous ethanol to afford 21β - hydroxy(2 - hydroxyethoxy)phosphinyl- 19-norpregna-4,17(20),20-trien-3-one as needle-like crystals, melting at about 113–116°. This compound exhibits an ultraviolet absorption maximum at about 239 millimicrons with a molecular extinction coefficient of about 16,100. Nuclear magnetic resonance signals are observed at about 61, 223–256 (multiplet), 314–331 (multiplet), 349 and 445 cycles per second. This compound is represented by the following structural formula

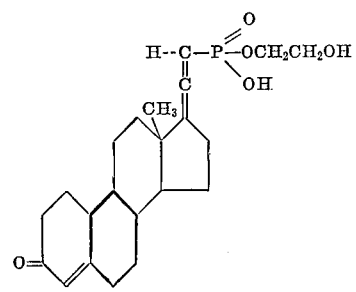

EXAMPLE 19

A slurry of 15 parts of 17β-hydroxy-17α-ethynyl-androst-4-en-3-one in 667 parts of methylene chloride containing 6.4 parts of pyridine is cooled to about —20° and 8 parts of ethylenechlorophosphite is added. The resulting reaction mixture is stirred and cooled for about 20 hours, then is washed successively with cold dilute hydrochloric acid, water, dilute aqueous potassium hydroxide, water and saturated aqueous sodium chloride. The washed organic layer is dried and concentrated under reduced pressure to afford a glass-like residue, which solidifies upon trituration with acetone. Purification of that material by recrystallization from dry ethanol affords 21β-ethylene-dioxyphosphinylpregna-4,17(20),20-trien-3-one, melting at about 192–194°. Infrared absorption maxima are observed at about 5.09, 6.00, 6.17, 7.18, 9.52, 10.75 and 12.10 microns, and nuclear magnetic resonance signals at 61.5, 73, 247–280 (multiplet), 323, 332.5 and 345 cycles per second. This compound is represented by the following structural formula

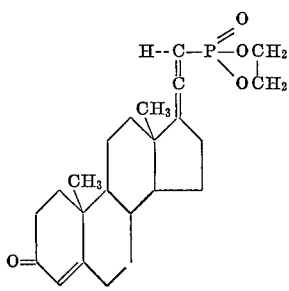

EXAMPLE 20

A mixture containing 19 parts of 21β-ethylenedioxy-phosphinylpregna-4,17(20),20-trien-3-one, 160 parts of acetone and 1 part by volume of 1 N hydrochloric acid is heated at the reflux temperature for about 1 hour, then is concentrated under reduced pressure. The resulting residue is dissolved in chloroform and the chloroform solution is extracted with dilute aqueous potassium hydroxide. That alkaline extract is stripped of dissolved chloroform by heating under reduced pressure, then is cooled and made acidic by the addition of dilute hydrochloric acid. The solids which precipitate are collected by filtration, then purified by recrystallization from ethanol to afford 21β-hydroxy(2-hydroxyethoxy)phosphi-nylpregna-4,17(20),20-trien-3-one, melting at about 125–128.5°. This compound displays an ultraviolet absorption maximum at about 240 millimicrons with a molecular extinction coefficient of about 16,800. Infrared absorption extinction coefficient of about 16,800. Infrared absorption peaks are observed at about 2.76, 2.92, 5.09, 5.96, 6.17, 9.17, 9.62 and 10.10 microns. Nuclear magnetic resonance peaks are displayed at about 62, 73, 225–265, 315–335, 346 and 389 cycles per second. This compound is represented by the following structural formula

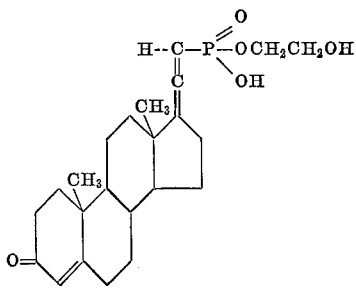

What is claimed is:

1. A compound of the formula

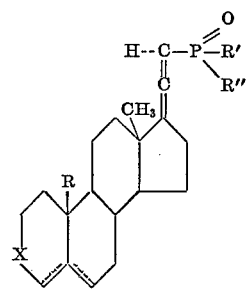

wherein R is selected from the group consisting of hydrogen and a methyl radical, R' is selected from the group consisting of phenyl, lower alkoxy and 2-hydroxyethoxy radicals, R'' is a phenyl radical when R' is a phenyl radical, R'' is an hydroxy or lower alkoxy radical when R' is a lower alkoxy radical, R'' is an hydroxy radical when R' is a 2-hydroxyethoxy radical or R' and R'' together comprise an ethylenedioxy radical, the dotted lines denote a double bond at either the 4,5 or 5,6 position, X is a carbonyl radical when the double bond is at the 4,5 position and X is selected from the group consisting of β-hydroxymethylene and β-(lower alkanoyl)oxy methylene radicals when the double bond is at the 5,6 position.

2. As in claim 1, a compound of the formula

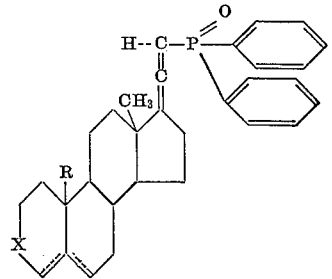

wherein R is selected from the group consisting of hydrogen and a methyl radical, the dotted lines denote a double bond at either the 4,5 or 5,6 position, X is a carbonyl radical when the double bond is at the 4,5 position and X is selected from the group consisting of β-hydroxymethylene and a β-(lower alkanoyl)oxymethylene radical when the double bond is at the 5,6 position.

3. As in claim 1, a compound of the formula

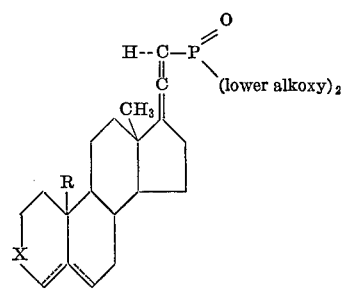

wherein R is selected from the group consisting of hydrogen and a methyl radical, the dotted lines denote a double bond at either the 4,5 or 5,6 position, X is a carbonyl radical when the double bond is at the 4,5 position and X is selected from the group consisting of β-hydroxymethylene and a β-(lower alkanoyl)oxymethylene radical when the double bond is at the 5,6 position.

4. As in claim 1, a compound of the formula

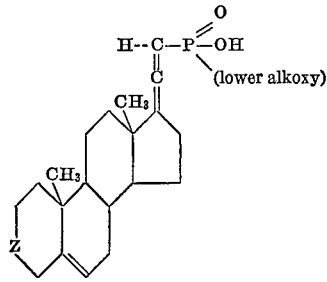

wherein Z is selected from the group consisting of β-hydroxymethylene and β-(lower alkanoyl)oxymethylene radicals.

5. As in claim 1, the compound which is 21β-diphenylphosphinylpregna-4,17(20),20-trien-3-one.

6. As in claim 1, the compound which is 21β-diethoxyphosphinylpregna-4,17(20),20-trien-3-one.

7. As in claim 1, the compound which is 21β-diethoxyphosphinylpregna-5,17(20),20-trien-3β-ol acetate.

8. As in claim 1, the compound which is 21β-diethoxyphosphinyl-19-norpregna-4,17(20),20-trien-3-one.

9. As in claim 1, the compound which is 21β-diethoxyphosphinylpregna-5,17(20),20-trien-3β-ol.

10. As in claim 1, the compound which is 21β-dimeoxyphosphinylpregna-5,17(20),20-trien-3β-ol acetate.

11. As in claim 1, the compound which is 21β-ethoxythoxyphosphinylpregna-5,17(20),20-trien-3β-ol acetate.

References Cited
UNITED STATES PATENTS
3,524,846   8/1970   Moffatt et al. _____ 260—211.5

LEWIS GOTTS, Primary Examiner
E. G. LOVE, Assistant Examiner

U.S. Cl. X.R.
260—397.5; 424—238, 242

UNITED STATES PATENT OFFICE
CERTIFICATE OF CORRECTION

Patent No. 3,631,075        Dated December 28, 1971

Inventor(s) Walter R. Benn

It is certified that error appears in the above-identified patent and that said Letters Patent are hereby corrected as shown below:

Column 1, line 52, "propionyl, butyryl, valeryl, caproyl, heptanoyl" should be -- propoxy, butoxy, pentyloxy, hexyloxy, heptyloxy --.

Column 2, line 37, "abovedescribed" should be -- above-described --.

Column 4, line 36, "chlorodiphenylphenylphosphine" should be -- chlorodiphenylphosphine --.

Column 4, formula,

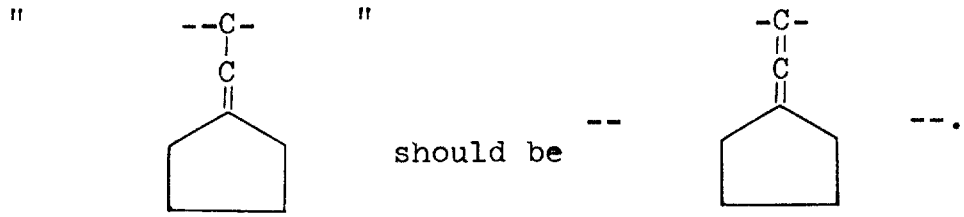

Column 9, line 71, "4,17(20,20-" should be -- 4,17(20)20- --.

Column 10, first formula,

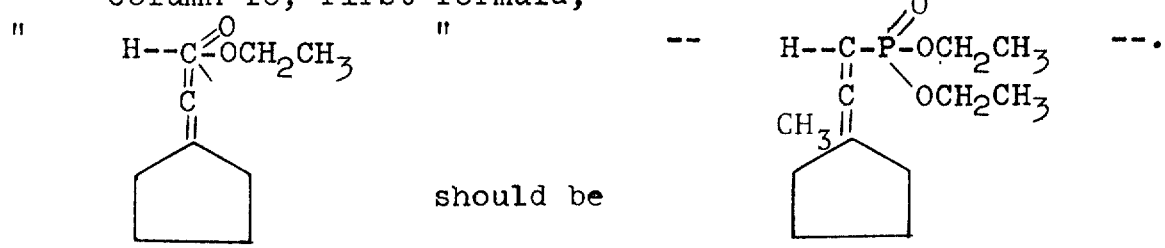

UNITED STATES PATENT OFFICE
CERTIFICATE OF CORRECTION

Patent No. 3,631,075            Dated December 28, 1971

Inventor(s)        Walter R. Benn

It is certified that error appears in the above-identified patent and that said Letters Patent are hereby corrected as shown below:

Column 10, line 68, 69, "hydroxy)(2-hydroxyethoxy)=phosphinylpregna" should be -- hydroxy(2-hydroxyethoxyphosphinylpregna- --.

Column 13, line 55, 56, delete "Infrared absorption extinction coefficient of about 16,800."

Column 16, line 10, "thoxyphosphinylpregna" should be -- hydroxyphosphinylpregna --.

Signed and sealed this 25th day of July 1972.

(SEAL)
Attest:

EDWARD M. FLETCHER, JR.          ROBERT GOTTSCHALK
Attesting Officer                Commissioner of Patents